United States Patent
Yanagisawa

(10) Patent No.: US 9,431,952 B2
(45) Date of Patent: Aug. 30, 2016

(54) CONSTRUCTION MACHINE AND METHOD OF CONTROLLING TURNING ELECTRIC MOTOR

(71) Applicant: SUMITOMO HEAVY INDUSTRIES, LTD., Tokyo (JP)

(72) Inventor: Makoto Yanagisawa, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 189 days.

(21) Appl. No.: 14/205,590

(22) Filed: Mar. 12, 2014

(65) Prior Publication Data
US 2014/0191690 A1 Jul. 10, 2014

Related U.S. Application Data

(63) Continuation of application No. PCT/JP2012/073543, filed on Sep. 13, 2012.

(30) Foreign Application Priority Data

Sep. 15, 2011 (JP) .................................. 2011-202117

(51) Int. Cl.
| G06F 7/70 | (2006.01) |
| H02P 29/00 | (2016.01) |
| E02F 9/12 | (2006.01) |
| E02F 9/20 | (2006.01) |

(52) U.S. Cl.
CPC .............. *H02P 29/00* (2013.01); *E02F 9/128* (2013.01); *E02F 9/2095* (2013.01)

(58) Field of Classification Search
CPC .................... H02P 27/06; B60K 6/46
USPC ............................................. 701/50
See application file for complete search history.

(56) References Cited

U.S. PATENT DOCUMENTS

| 8,437,923 B2 * | 5/2013 | Sano ...................... E02F 9/123 37/347 |
| 2005/0242538 A1 * | 11/2005 | Hiramatsu ........... A63C 17/004 280/92 |

FOREIGN PATENT DOCUMENTS

| EP | 2208829 | 7/2010 |
| GB | 2431248 | 4/2007 |
| JP | 2010-095906 | 4/2010 |
| JP | 2010-138586 | 6/2010 |
| JP | 2010-150896 | 7/2010 |
| JP | 2010150896 A * | 7/2010 |

OTHER PUBLICATIONS

International Search Report mailed on Dec. 18, 2012.

* cited by examiner

*Primary Examiner* — Eduardo Colon Santana
*Assistant Examiner* — Bickey Dhakal
(74) *Attorney, Agent, or Firm* — IPUSA, PLLC

(57) ABSTRACT

A construction machine includes a turning electric motor configured to drive a turning mechanism configured to cause an upper-part turning body to turn relative to a lower-part traveling body and a control unit configured to control driving of the turning electric motor. The control unit is configured to cause the output of the turning electric motor to continue after the turning speed of the upper-part turning body becomes zero, based on the magnitude of the output or the direction of the output of the turning electric motor at the time when the upper-part turning body is decelerated and its turning speed becomes zero.

14 Claims, 16 Drawing Sheets

(a)

DRIVING DIRECTION (b)

DRIVING DIRECTION (a)

(b)

(a)

DRIVING DIRECTION

GRAVITY ACTING DIRECTION (b)

GRAVITY ACTING DIRECTION

DRIVING DIRECTION

US 9,431,952 B2

CONSTRUCTION MACHINE AND METHOD OF CONTROLLING TURNING ELECTRIC MOTOR

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2012/073543, filed on Sep. 13, 2012 and designating the U.S., which claims priority to Japanese Patent Application No. 2011-202117, filed on Sep. 15, 2011. The entire contents of the foregoing applications are incorporated herein by reference.

BACKGROUND

1. Technical Field

The present invention relates to a construction machine including an electric turning control unit that drives a turnable body, and a method of controlling a turning electric motor.

2. Description of Related Art

Construction machines such as shovels often include a turnable body (referred to as upper-part turning body) in order to perform work while turning work mechanisms such as an arm and a boom. A turning mechanism is provided in order to turn the turnable body. A turning electric motor may be used in place of a hydraulic motor as a power source of the turning mechanism.

Proportional integral control (PI control) is often used to control driving of the turning mechanism. According to control of the turning electric motor based on PI control, the torque of the turning electric motor is controlled by integrating deviations between a speed command concerning the turning speed of the turnable body and an actual turning speed. In this case, decelerating and stopping the turnable body turning at a certain turning speed may cause the phenomenon that the turnable body stops near the stop position while swinging back and forth. This swinging is referred to as swing-back. There are several causes of the swing-back, one of which is attributable to the above-described PI control.

At the instant when the turning speed becomes zero, the torque of the turning electric motor does not become zero and the turning electric motor is outputting a torque pertaining to integral control. Assuming that the turning plane of the turnable body is a horizontal plane, the torque pertaining to integral control is a torque whose direction is opposite to the turning direction. This torque causes the turnable body to turn in the opposite direction after becoming stationary (becoming zero in speed). Then, the direction of the torque pertaining to the integral control also is reversed, so that the turn is controlled and the speed becomes zero. Then, again, a torque is generated in an opposite direction. Thus, while swinging back and forth near the stop position, the turnable body attenuates its amplitude and stops. This swinging is a swing-back.

In order to control the above-described swing-back, it has been proposed to reset the torque pertaining to integral control to zero at the instant when the speed of the turnable body becomes zero.

SUMMARY

According to an embodiment of the present invention, a construction machine is provided that includes a turning electric motor configured to drive a turning mechanism configured to cause an upper-part turning body to turn relative to a lower-part traveling body and a control unit configured to control driving of the turning electric motor, wherein the control unit is configured to cause the output of the turning electric motor to continue after the turning speed of the upper-part turning body becomes zero, based on the magnitude of the output or the direction of the output of the turning electric motor at the time when the upper-part turning body is decelerated and its turning speed becomes zero.

Furthermore, a method of controlling a turning electric motor configured to drive a turning mechanism configured to turn an upper-part turning body relative to a lower-part traveling body is provided that includes causing the upper-part turning body to turn relative to the lower-part traveling body by driving the turning electric motor to rotate in one direction, decelerating the upper-part turning body by driving the turning electric motor to rotate in a reverse direction, and causing the output of the turning electric motor to continue after the turning speed of the upper-part turning body becomes zero, based on the magnitude of the output or the direction of the output of the turning electric motor at the time when the upper-part turning body is decelerated and the turning speed thereof becomes zero.

Other objects, features and advantages of the present invention will become more apparent from the following detailed description when read in conjunction with the accompanying drawings.

DETAILED DESCRIPTION

Figure 1:
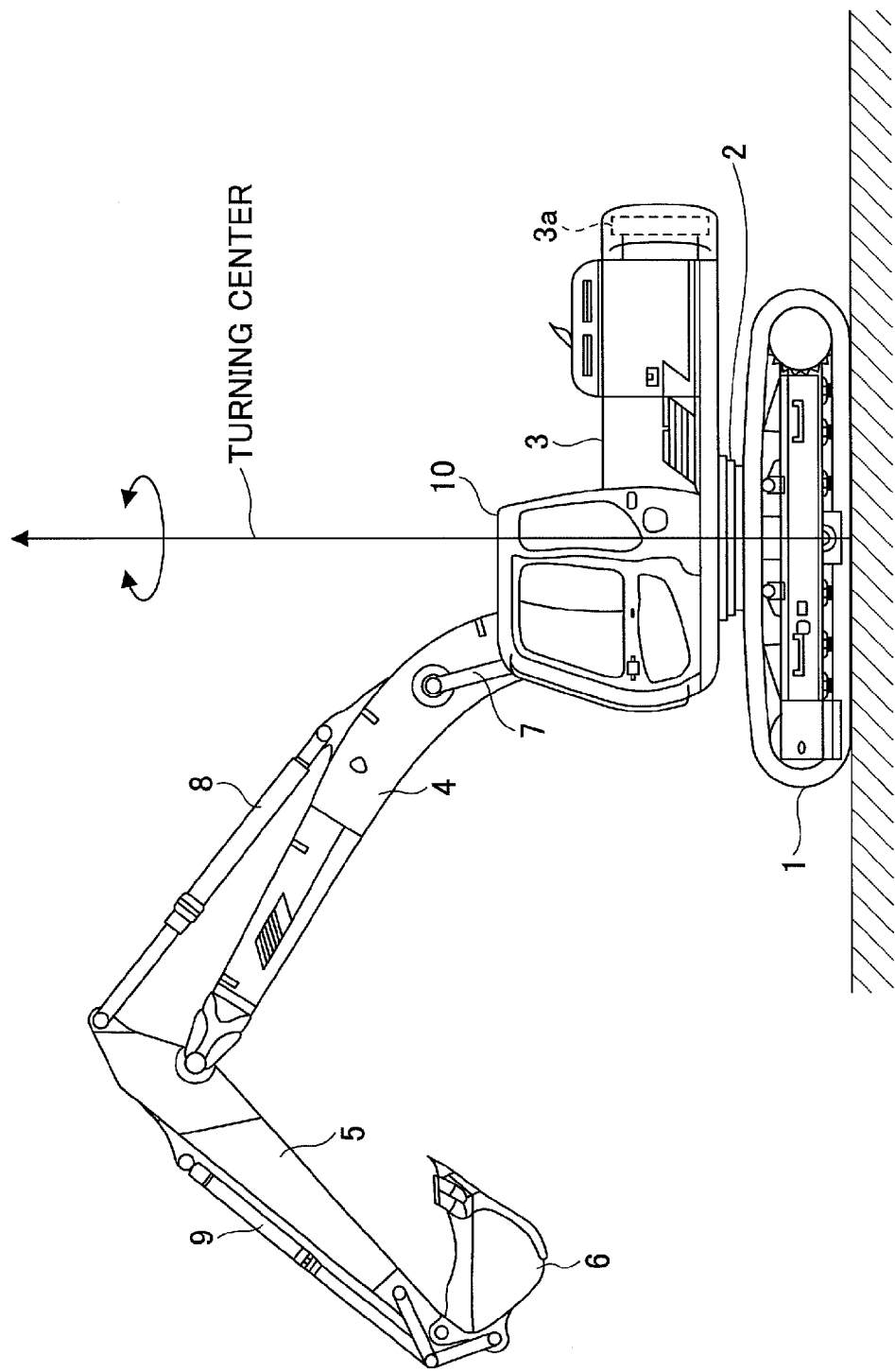
FIG. 1 is a side view of a hybrid shovel.

Resetting a torque pertaining to integral control to zero at the instant when the speed of a turnable body becomes zero produces a swing-back controlling effect when the turning plane of the turnable body is horizontal. This is undesirable, however, when the turning plane of the turnable body is inclined relative to a horizontal direction. That is, when the center of gravity of the turnable body is offset to the turning center of the turnable body and the turning plane is inclined, a torque that causes the turnable body to turn in an opposite direction may increase in place of the swing-back controlling effect.

Specifically, the turning plane of the turnable body may be inclined relative to a horizontal plane and a turn in a direction to cause the center of gravity of the turnable body to go downward along a slope may be stopped. The turn of such a condition is referred to as "downward turn."

In the "downward turn," the turnable body may be caused by its own weight to again turn immediately after a stop. When the turnable body is stopped, being inclined along a slope, there has to be some torque of a turning electric motor remaining in order to prevent the turnable body from falling downward along the slope. This is for preventing the turnable body from turning downward because of its own weight before generation of a torque for keeping the turnable body stationary (a torque for keeping the speed of the turnable body zero) in the case where the torque of the turning electric motor is reset to zero at the instant when the speed of the turnable body becomes zero.

The turning plane of the turnable body may be inclined relative to a horizontal plane and, contrary to the above-described downward slope turn, a turn in a direction to cause the center of gravity of the turnable body to go upward along a slope may be stopped. The turn of such a condition is referred to as "upward turn."

In the "upward turn," in the case where the turnable body stops with a relatively large deceleration, the integral control torque generated by the turning electric motor immediately before the stop of the turnable body is a torque in a direction opposite to the turning direction. Accordingly, it is possible to immediately generate a torque in an opposite direction (a torque in a direction to maintain the stop of the turnable body) by resetting this torque to zero at the instant when the turnable body stops.

On the other hand, when the turnable body is relatively moderately decelerated and stopped in the "upward turn," the integral control torque generated by the turning electric motor immediately before the stop of the turnable body is already a torque in the same direction as a torque for keeping the turnable body stationary. Accordingly, resetting this torque to zero at the instant when the turnable body stops may accelerate the downward turn of the turnable body before a torque is generated again.

Accordingly, there is a demand for the development of a construction machine and a method of controlling a turning electric motor that address the above-described point.

According to an aspect of the present invention, in the case where a lower-part traveling body is positioned on a slope, it is possible to control a fall of an upper-part turning body while controlling the swing-back of the upper-part turning body when the upper-part turning body is stopped after turning.

FIG. 1 is a side view of a hybrid shovel, which is an example of a construction machine including an electric turning drive unit according to an embodiment.

An upper-part turning body 3 is mounted through a turning mechanism 2 on a lower-part traveling body 1 of the hybrid shovel. A boom 4, an arm 5, a bucket 6 and a boom cylinder 7, an arm cylinder 8 and a bucket cylinder 9 for hydraulically driving the boom 4, the arm 5 and the bucket 6, respectively, are provided on the upper-part turning body 3. Furthermore, a cabin 10 and power sources are mounted on the upper-part turning body 3. Furthermore, a counterweight 3a is provided on the side opposite to the side of the bucket 6 in the upper-part turning body 3.

Figure 2:
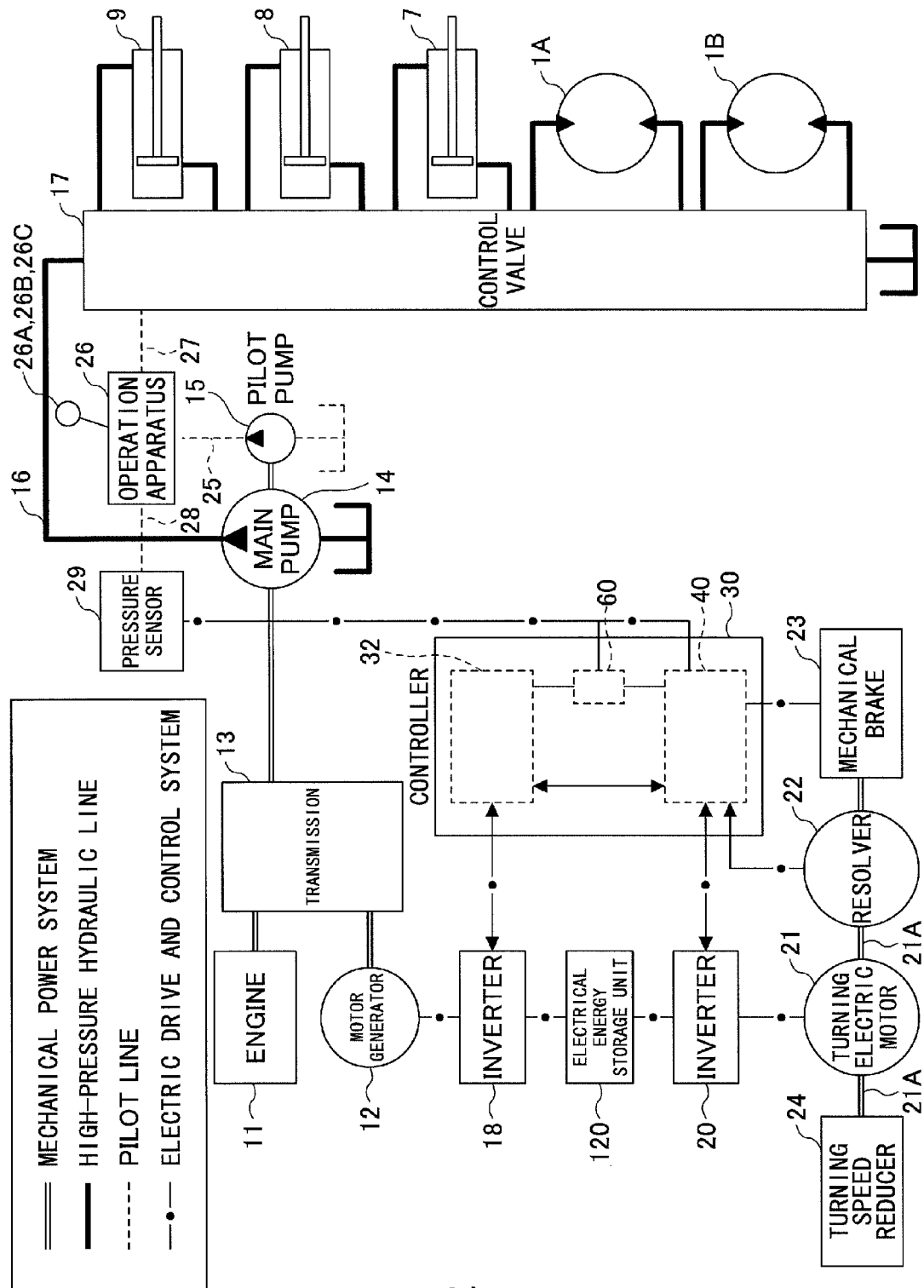
FIG. 2 is a block diagram illustrating a configuration of a drive system of the hybrid shovel according to an embodiment.

FIG. 2 is a block diagram illustrating a configuration of a drive system of the hybrid shovel. In FIG. 2, a mechanical power system, a high-pressure hydraulic line, a pilot line, and an electric drive and control system are indicated by a double line, a solid line, a broken line, and a dot-dash line, respectively.

An engine 11 as a mechanical drive part and a motor generator 12 as an assist drive part are connected to input shafts of a transmission 13. A main pump 14 and a pilot pump 15 are connected to an output shaft of the transmission 13. A control valve 17 is connected to the main pump 14 via a high-pressure hydraulic line 16.

The control valve 17 is a control unit that controls a hydraulic system. Hydraulic motors 1A (right) and 1B (left) for the lower-part traveling body 1, the boom cylinder 7, the arm cylinder 8 and the bucket cylinder 9 are connected to the control valve 17 via high-pressure hydraulic lines.

An electrical energy storage unit 120 including a capacitor or a battery for storing electrical energy is connected to the motor generator 12 via an inverter 18. It is assumed that the electrical energy storage unit 120 includes a capacitor as an electrical energy storage device in this embodiment. A turning electric motor 21 is connected to the electrical energy storage unit 120 via an inverter 20.

Figure 3:
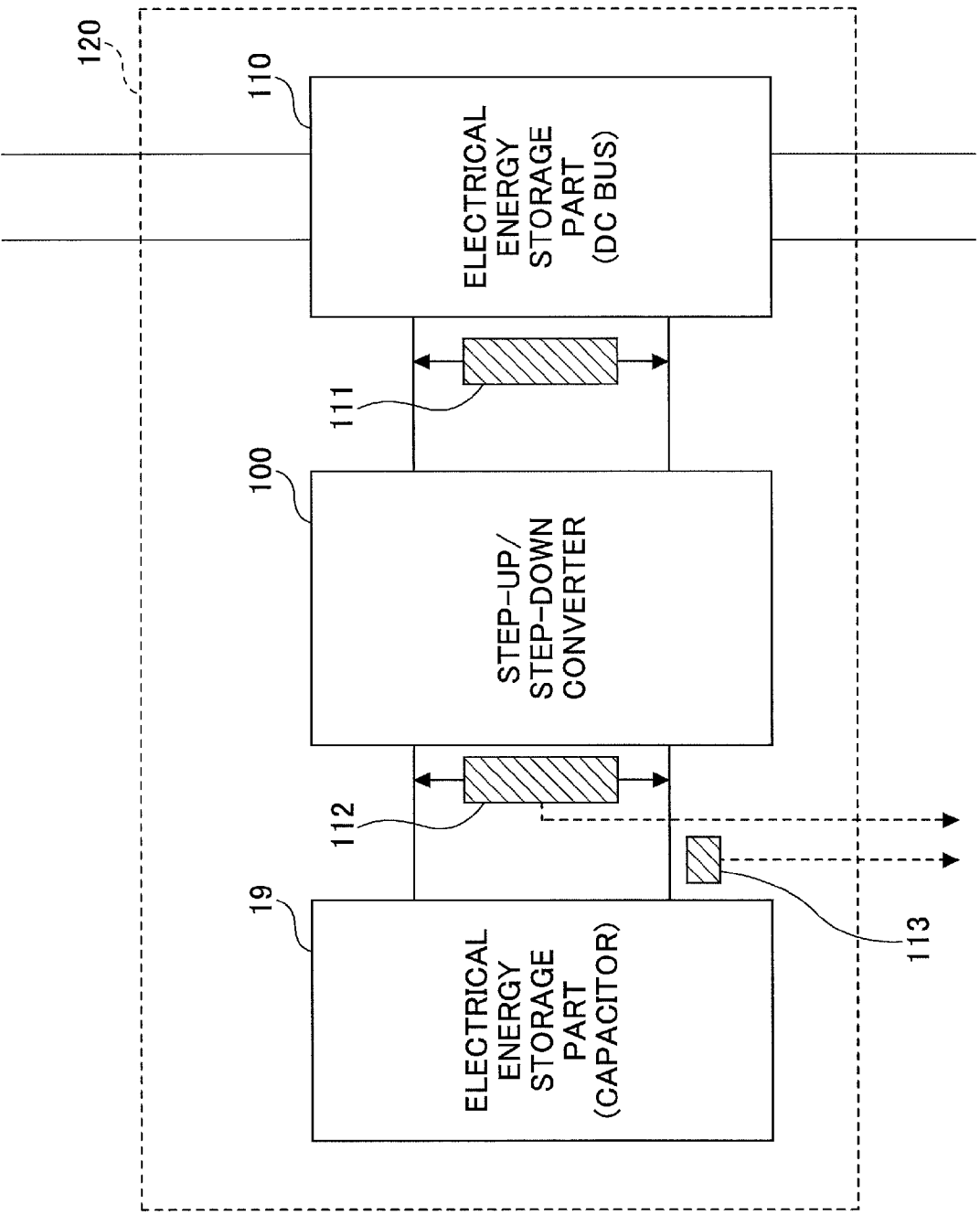
FIG. 3 is a block diagram illustrating a configuration of an electrical energy storage system.

FIG. 3 is a block diagram illustrating a configuration of the electrical energy storage unit 120. The electrical energy storage unit 120 includes a capacitor 19 as an electrical energy storage device, a step-up/step-down converter 100, and a DC bus 110. The DC bus 110 controls the transfer of electric power among the capacitor 19, the motor generator 12 and the turning electric motor 21. The capacitor 19 is provided with a capacitor voltage detecting part 112 for detecting a capacitor voltage value and a capacitor current detecting part 113 for detecting a capacitor current value. The capacitor voltage value and the capacitor current value detected by the capacitor voltage detecting part 112 and the capacitor current detecting part 113, respectively, are fed to a controller 30.

The step-up/step-down converter 100 performs control to switch a step-up operation and a step-down operation in accordance with the operating states of the motor generator 12 and the turning electric motor 21, so that the DC bus voltage value falls within a certain range. The DC bus 110 is provided between the inverters 18 and 20 and the step-up/step-down converter 100 to transfer electric power among the capacitor 19, the motor generator 12 and the turning electric motor 21. Furthermore, while a capacitor is used as an electrical energy storage device in the case illustrated above, a rechargeable battery capable of being discharged and recharged, such as a lithium ion battery, or other form of power supply capable of receiving and transferring electric power may alternatively be used as an electrical energy storage device in place of a capacitor.

Referring back to FIG. 2, a resolver 22, a mechanical brake 23 and a turning speed reducer 24 are connected to a rotating shaft 21A of the turning electric motor 21. Furthermore, an operation apparatus 26 is connected to the pilot pump 15 via a pilot line 25.

The control valve 17 and a pressure sensor 29 as a lever operation detecting part are connected to the operation apparatus 26 via hydraulic lines 27 and 28, respectively. The controller 30, which controls driving of an electric system, is connected to the pressure sensor 29.

Power sources such as the engine 11, the motor generator 12 and the turning electric motor 21 are mounted on the upper-part turning body 3 illustrated in FIG. 1. A description is given below of each part.

The engine 11 is, for example, an internal combustion engine formed of a diesel engine. The engine 11 has an output shaft connected to one input shaft of the transmission 13. The engine 11 is in constant operation during the operation of the shovel.

The motor generator 12 may be any electric motor capable of both a power running operation and a regenerative operation. Here, a motor generator AC-driven by the inverter 20 is illustrated as the motor generator 12. The motor generator 12 may be formed of, for example, an IPM (Interior Permanent Magnetic) motor having magnets embedded in a rotor. The rotating shaft of the motor generator 12 is connected to another input shaft of the transmission 13.

The transmission 13 includes two input shafts and one output shaft. A drive shaft of the engine 11 and a drive shaft of the motor generator 12 are connected to the two input shafts. A drive shaft of the main pump 14 is connected to the output shaft. In the case of a heavy load on the engine 11, the motor generator 12 performs a power running operation, so that the driving force of the motor generator 12 is transmitted to the main pump 14 via the output shaft of the transmission 13. This assists driving of the engine 11. On the other hand, in the case of a light load on the engine 11, the driving force of the engine 11 is transmitted to the motor generator 12 via the transmission 13, so that the motor generator 12 performs a regenerative operation to generate electric power. The power running operation and the regenerative operation of the motor generator 12 are switched by the controller 30 in accordance with a load on the engine 11.

The main pump 14 is a pump that generates a hydraulic pressure to be supplied to the control valve 17. The hydraulic pressure generated by the main pump 14 is supplied via the control valve 17 to drive each of the hydraulic motors 1A and 1B, the boom cylinder 7, the arm cylinder 8 and the bucket cylinder 9. The pilot pump 15 is a pump that generates a pilot pressure necessary for a hydraulic operation system.

The control valve 17 is a hydraulic pressure control unit that controls hydraulic driving of the hydraulic motors 1A and 1B for the lower-part traveling body 1, the boom cylinder 7, the arm cylinder 8 and the bucket cylinder 9, which are connected via high-pressure hydraulic lines to the control valve 17, by controlling a hydraulic pressure to be supplied to each of the hydraulic motors 1A and 1B, the boom cylinder 7, the arm cylinder 8 and the bucket cylinder 9 in accordance with an operator's operation and input.

As described above, the inverter 18 is provided between the motor generator 12 and the electrical energy storage unit 120 and controls the operation of the motor generator 12 based on a command from the controller 30. Thus, when the inverter 18 is in control of the power running operation of the motor generator 12, necessary electric power is supplied from the electrical energy storage unit 120 to the motor generator 12. Furthermore, when the inverter 18 is in control of the regenerative operation of the motor generator 12, the electric power generated by the motor generator 12 is stored in the capacitor 19 of the electrical energy storage unit 120.

The electrical energy storage unit 120 is provided between the inverter 18 and the inverter 20. As a result, when at least one of the motor generator 12 and the turning electric motor 21 is performing a power running operation, the electrical energy storage unit 120 supplies electric power necessary for the power running operation. When at least one of the motor generator 12 and the turning electric motor 21 is performing a regenerative operation, the electrical energy storage unit 120 stores the electric power regenerated by the regenerative operation as electrical energy.

As described above, the inverter 20 is provided between the turning electric motor 21 and the electrical energy storage unit 120, and controls the operation of the turning electric motor 21 based on a command from the controller 30. Thus, when the inverter 20 is in control of the power running operation of the turning electric motor 21, necessary electric power is supplied from the electrical energy storage unit 120 to the turning electric motor 21. Furthermore, when the turning electric motor 21 is performing a regenerative operation, the electric power generated by the turning electric motor 21 is stored in the capacitor 19 of the electrical energy storage unit 120.

The turning electric motor 21 may be any electric motor capable of both a power running operation and a regenerative operation, and is provided to drive the turning mechanism 2 for the upper-part turning body 3. At the time of a power running operation, the rotational force of the rotational driving force of the turning electric motor 21 is amplified in the turning speed reducer 24, and the upper-part turning body 3 is subjected to acceleration or deceleration control to perform a rotary motion. Furthermore, because of the inertia rotation of the upper-part turning body 3, the number of revolutions is increased in the turning speed reducer 24 and transmitted to the turning electric motor 21, so that it is possible to regenerate electric power. Here, an electric motor AC-driven by the inverter 20 based on a PWM (Pulse Width Modulation) control signal is illustrated as the turning electric motor 21. The turning electric motor 21 may be formed of, for example, an IPM motor of a magnet embedded type. This makes it possible to generate a greater induced electromotive force, so that it is possible to increase the electric power generated in the turning electric motor 21 at the time of regeneration.

The charge and discharge of the battery 19 of the electrical energy storage unit 120 is controlled by the controller 30 based on the state of charge of the battery 19, the operating state (power running operation or regenerative operation) of the motor generator 12, and the operating state (power running operation or regenerative operation) of the turning electric motor 21.

The resolver 22 is a sensor that detects the rotational position and the rotation angle of the rotating shaft 21A of the turning electric motor 21. The resolver 22 is mechanically connected to the turning electric motor 21 to detect a difference between the rotational position before a rotation and the rotational position after a counterclockwise rotation or a clockwise rotation of the rotating shaft 21A of the turning electric motor 21, thereby detecting the rotation angle and the rotation direction of the rotating shaft 21A. By detecting the rotation angle of the rotating shaft 21A of the turning electric motor 21, it is possible to determine the rotation angle and the rotation direction of the turning mechanism 2.

The mechanical brake 23, which is a brake unit that generates a mechanical braking force, mechanically stops the rotating shaft 21A of the turning electric motor 21. The mechanical brake 23 is switched between braking and release by an electromagnetic switch. This switching is performed by the controller 30.

The turning speed reducer 24 is a transmission that reduces the rotational, speed of the rotating shaft 21A of the turning electric motor 21 and mechanically transmits the rotational speed to the turning mechanism 2. This makes it possible to increase the rotational force of the turning electric motor 21 and to transmit the rotational force as a greater rotational force to the turnable body at the time of a power running operation. On the other hand, at the time of a regenerative operation, it is possible to increase the number of revolutions generated in the turnable body and cause more rotation operations to be generated in the turning electric motor 21.

The turning mechanism 2 is turnable with the mechanical brake 23 of the turning electric motor 21 being released, and the upper-part turning body 3 is turned counterclockwise or clockwise in this state.

The operation apparatus 26, which is an operation apparatus for operating the turning electric motor 21, the lower-part traveling body 1, the boom 4, the arm 5 and the bucket 6, includes levers 26A and 26B and pedals 26C. The lever 26A, which is a lever for operating the turning electric motor 21 and the arm 5, is provided near the driver's seat of the upper-part turning body 3. The lever 263, which is a lever for operating the boom 4 and the bucket 6, is provided near the driver's seat of the upper-part turning body 3. The pedals 26C, which are a pair of pedals for operating the lower-part traveling body 1, are provided at the foot of the driver's seat.

The operation apparatus 26 converts a hydraulic pressure (a primary-side hydraulic pressure) supplied through the pilot line 25 into a hydraulic pressure (a secondary-side hydraulic pressure) commensurate to the amount of operation by the operator (for example, a lever inclination angle with reference to a neutral position), and outputs the converted hydraulic pressure. The secondary-side hydraulic pressure output from the operation apparatus 26 is supplied to the control valve 17 through the hydraulic lines 27, and is detected by the pressure sensor 29.

When the levers 26A and 26B and the pedal 26C are operated respectively, the control valve 17 is driven via the hydraulic lines 27, so that the hydraulic pressures inside the hydraulic motors 1A and 1B, the boom cylinder 7, the arm cylinder 8 and the bucket cylinder 9 are controlled. Thereby, the lower-part traveling body 1, the boom 4, the arm 5 and the bucket 6 are driven.

The hydraulic lines 27 are provided with one for each of the hydraulic motors 1A and 1B for their operations (that is, two in total) and two for each of the boom cylinder 7, the arm cylinder 8 and the bucket cylinder 9 for their operations (that is, six in total). Accordingly, the hydraulic lines 27 are actually eight in number, but are graphically represented collectively as a single line for convenience of description in FIG. 2.

The pressure sensor 29 as a lever operation detecting part detects a change in the hydraulic pressure inside the hydraulic line 28 due to the operation of the lever 26A. The pressure sensor 29 outputs an electrical signal that represents the hydraulic pressure inside the hydraulic line 28. This electrical signal is input to the controller 30. This makes it possible to accurately determine the amount of operation of the lever 26A. While a pressure sensor as a lever operation detecting part is used in this embodiment, a sensor that directly reads the amount of operation of the lever 26A as an electrical signal may alternatively be used.

The controller 30, which is a control unit that controls driving of the shovel, includes a drive control unit 32, an electric turning control unit 40 and a main control part 60. The controller 30 is formed of a processor including a CPU (Central Processing Unit) and an internal memory. The drive control unit 32, the electric turning control unit 40 and the main control part 60 are devices implemented by the CPU of the controller 30 executing a program for drive control contained in the internal memory.

A speed command conversion part 31 (FIG. 4) is a processing part that converts a signal input from the pressure sensor 29 into a speed command. Thereby, the amount of operation of the lever 26A is converted into a speed command (rad/s) for causing the turning electric motor 21 to rotate. This speed command is input to the drive control unit 32, the electric turning control unit 40 and the main control part 60.

The drive control unit 32 is a control unit for controlling the operation (switching the power running operation or the regenerative operation) of the motor generator 12 and controlling the charge and discharge of the capacitor 19. The drive control unit 32 switches the power running operation and the regenerative operation of the motor generator 12 in accordance with the load state of the engine 11 and the state of charge of the capacitor 19. The drive control unit 32 controls the charge and discharge of the capacitor 19 via the inverter 18 by switching the power running operation and the regenerative operation of the motor generator 12.

Figure 4:
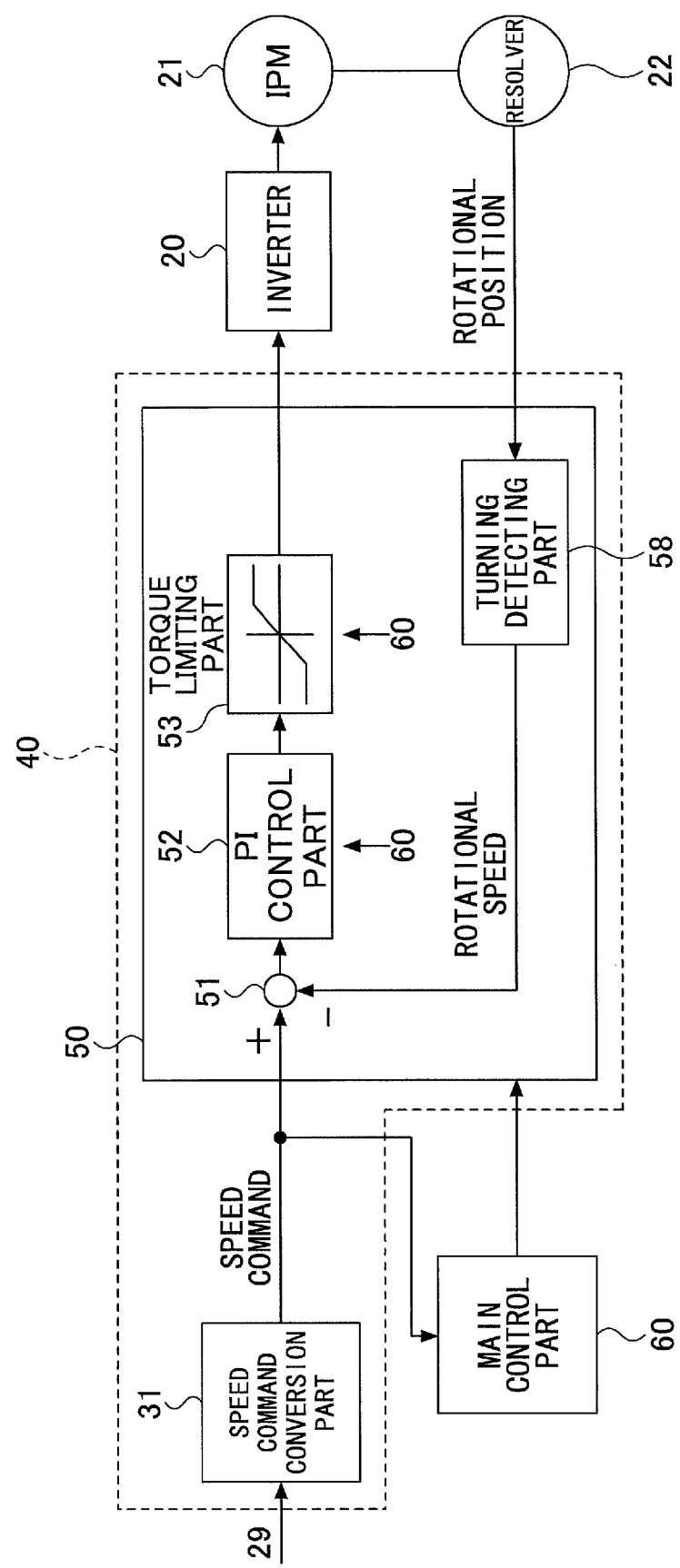
FIG. 4 is a block diagram of an electric turning control unit.

FIG. 4 is a block diagram illustrating a configuration of the electric turning control unit 40 according to this embodiment. The electric turning control unit 40 is a control unit for controlling the turning of the upper-part turning body 3 by controlling driving of the turning electric motor 21 via the inverter 20. The electric turning control unit 40 includes a drive command generation part 50 that generates a torque current increase/decrease value (a torque command value) for driving the turning electric motor 21, and the speed command conversion part 31.

A speed command output from the speed command conversion part 31 in accordance with the amount of operation of the lever 26A is input to the drive command generation part 50, and this drive command generation part 50 generates a torque current increase/decrease value based on the speed command. The torque current increase/decrease value output from the drive command generation part 50 is input to the inverter 20, and the turning electric motor 21 is AC-driven by this inverter 20 based on a PWM control signal.

The inverter 20 accelerates or decelerates the turning electric motor 21 in a counterclockwise direction or a clockwise direction by increasing or decreasing a torque current value based on the torque current increase/decrease value received from the drive command generation part 50. For example, the inverter 20 increases the torque of the turning electric motor 21 for causing the upper-part turning body 3 to turn counterclockwise as the torque current value increases on the negative side, and increases the torque of the turning electric motor 21 for causing the upper-part turning body 3 to turn clockwise as the torque current value increases on the positive side.

The main control part 60 is a control part that performs peripheral processing necessary for controlling the electric turning control unit 40. The specific contents of the processing are described at each related part.

The drive command generation part 50 includes a subtractor 51, a PI control part 52, a torque limiting part 53 and a turning detecting part 58. A speed command (rad/s) for turning drive commensurate to the amount of operation of the lever 26A is input to the subtractor 51 of this drive command generation part 50.

The subtractor 51 subtracts the rotational speed (rad/s) of the turning electric motor 21 detected by the turning detecting part 58 from the value of a speed command (hereinafter, speed command value) commensurate to the amount of operation of the lever 26A, and outputs a deviation. This deviation is used for PI control for bringing the rotational speed of the turning electric motor 21 closer to the speed command value (target value) in the PI control part 52 described below.

The PI control part 52 performs PI control based on the deviation input from the subtractor 51 so as to bring the rotational speed of the turning electric motor 21 closer to the speed command value (target value) (that is, so as to reduce this deviation), and calculates a torque current increase/decrease value necessary therefor. The generated torque current increase/decrease value is input to the torque limiting part 53.

Specifically, the PI control part 52 determines the torque current increase/decrease value by adding up a value (a proportional component) obtained by multiplying a deviation input from the subtractor 51 in a current control cycle by a predetermined proportional (P) gain and a value (an integral component) obtained by multiplying the sum of the deviation input from the subtractor 51 in the current control cycle and the integrated value (integral value) of the deviations integrated by the last control cycle by a predetermined integral (I) gain.

Furthermore, when the amount of operation of the lever 26A shifts from a counterclockwise (clockwise) turning drive region to a zero speed command region or shifts further to a dead zone region beyond the zero speed command region so that the braking of turning is started based on a zero speed command (a transition is made from a turn mode to a stop [maintaining control] mode), the PI control part 52 resets the integrated value (integral value) of deviations (to 0) when the rotational speed of the turning electric motor 21 first reaches zero (0).

Thus, the PI control part 52 can control a swing-back by preventing an excessive braking torque from remaining by resetting the integral component of the feedback control when the rotational speed of the turning electric motor 21 becomes zero. On the other hand, the PI control part 52 continues the feedback control even at the point when the rotational speed of the turning electric motor 21 becomes zero. Therefore, if a deviation is generated between the zero speed command and the rotational speed, a correcting operation by PI control is performed, so that it is possible to prevent the stop of turning from being delayed.

The rotational speed of the turning electric motor 21 is represented by a positive value in the case of a clockwise turn and by a negative value in the case of a counterclockwise turn. Therefore, the PI control part 52 resets the integrated value (integral value) of deviations at the time of detecting that the rotational speed of the turning electric motor 21 becomes less than or equal to zero when the turning direction before the start of the braking of turning is a counterclockwise direction or at the time of detecting that the rotational speed of the turning electric motor 21 becomes more than or equal to zero when the turning direction before the start of the braking of turning is a clockwise direction. Alternatively, the rotational speed of the turning electric motor 21 may be converted to an absolute value, and the PI control part 52 may reset the integrated value (integral value) of deviations at the time when the absolute value becomes less than or equal to zero irrespective of the turning direction.

The main control part 60 determines whether the rotational speed of the turning electric motor 21 has first reached zero (0). In response to receiving the determination result that the rotational speed of the turning electric motor 21 has first reached zero (0), the PI control part 52 resets the integral component.

The torque limiting part 53 limits the size of variations in the torque current increase/decrease value in accordance with the amount of operation of the lever 26A.

A sudden change in the torque current increase/decrease calculated by the PI control part 52 degrades turn controllability. Therefore, such limiting of the variation size of the torque current increase/decrease value is performed to control such degradation. This limitation characteristic has a characteristic for limiting sudden turns of the upper-part turning body 3 in both the counterclockwise direction and the clockwise direction, and has the characteristic of gradually increasing the variation size of the torque current increase/decrease value in accordance with an increase in the amount of operation of the lever 26A.

Data showing the limitation characteristic (provided in the form of a reference table, for example) are stored in the internal memory of the main control part 60, and are read by the torque limiting part 53.

Next, a description is given of the turning of the upper-part turning body 3 of the above-described hybrid shovel.

Figure 5:
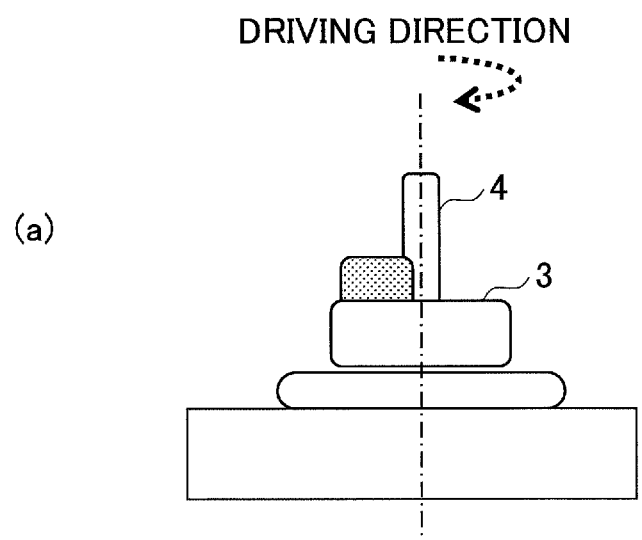
FIG. 5 is a diagram for illustrating the turning of an upper-part turning body at the time when the shovel is placed on a horizontal plane.
Figure 5:
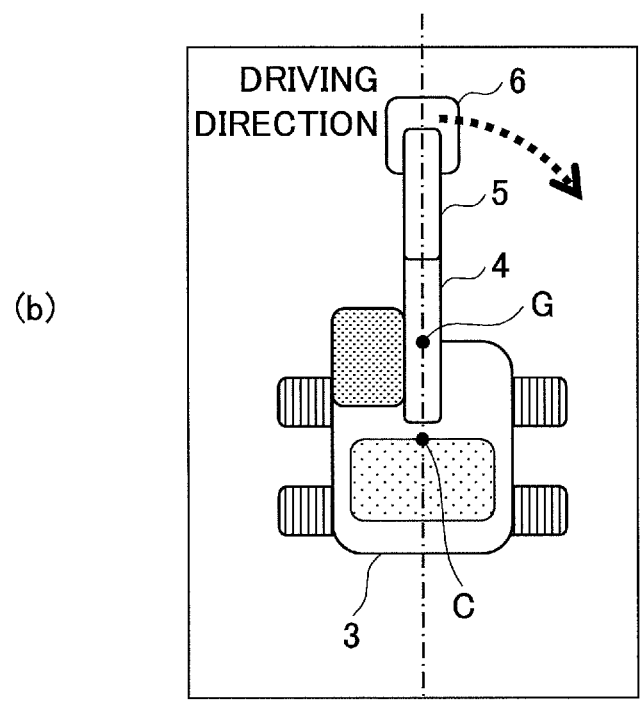
Figure 6:
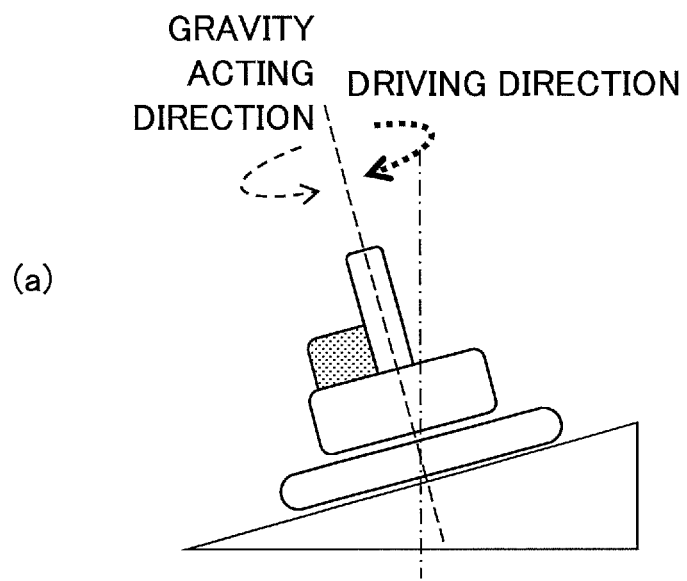
FIG. 6 is a diagram for illustrating the turning of the upper-part turning body at the time when the upper-part turning body is driven to turn in a direction to defy gravity when the shovel is placed with an inclination relative to a horizontal plane.
Figure 6:
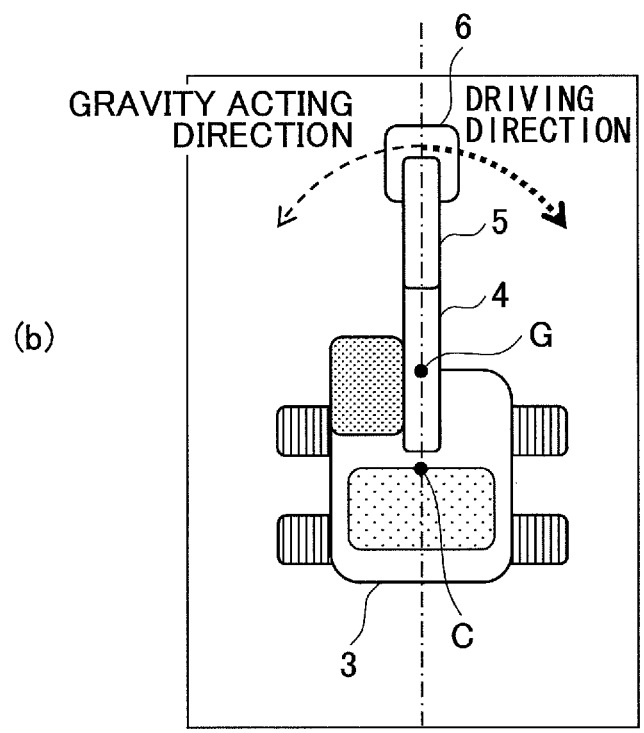
Figure 7:
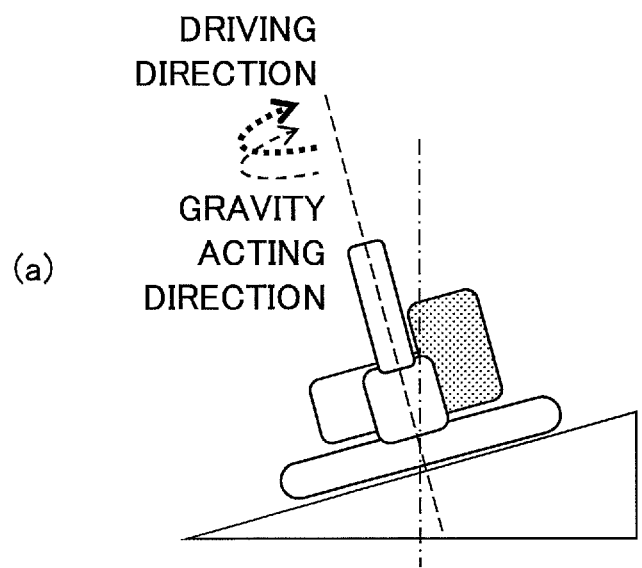
FIG. 7 is a diagram for illustrating the turning of the upper-part turning body at the time when the upper-part turning body is driven to turn in a direction in which gravity acts when the shovel is placed with an inclination relative to a horizontal plane.
Figure 7:
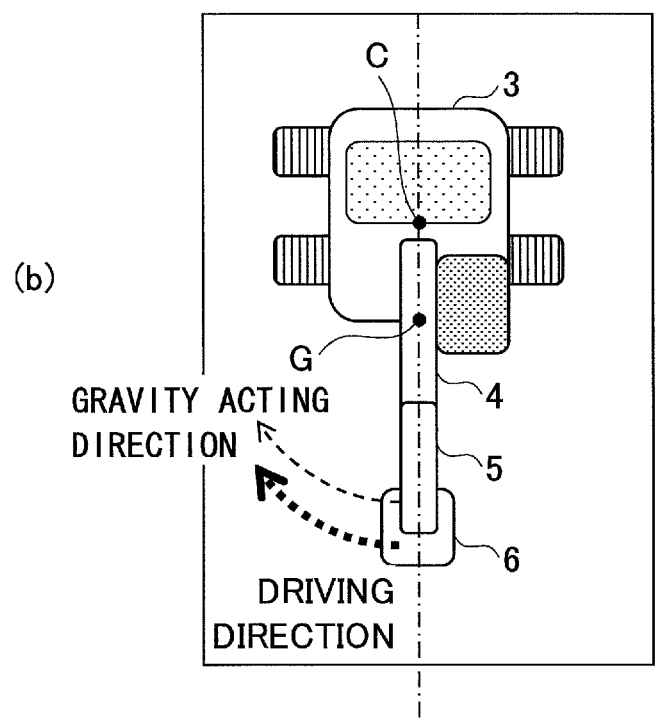

FIG. 5 is a diagram for illustrating the turning of the upper-part turning body 3 at the time when the shovel is placed on a horizontal plane. FIG. 6 is a diagram for illustrating the turning of the upper-part turning body 3 at the time when the upper-part turning body 3 is driven to turn in a direction to defy gravity when the shovel is placed with an inclination relative to a horizontal plane. FIG. 7 is a diagram for illustrating the turning of the upper-part turning body 3 at the time when the upper-part turning body 3 is driven to turn in a direction in which gravity acts when the shovel is placed with an inclination relative to a horizontal plane.

When the shovel is placed on level ground (a horizontal plane), gravity does not affect turning whether the upper-part turning body 3 makes a clockwise turn or a counterclockwise turn. Usually, in the state where the boom 4 is lowered and the arm 5 is extended as illustrated in (b) of FIG. 5, the center of gravity G of the upper-part turning body 3 including the bucket 6, the arm 5 and the boom 4 does not coincide with the turning center C of the upper-part turning body 3 and is on the bucket 6 side. When the turning plane of the upper-part turning body 3 coincides with the horizontal plane, that is, when the turning axis of the upper-part turning body 3 coincides with a vertical direction as illustrated in (a) of FIG. 5, there is no effect of gravity over the turning of the upper-part turning body 3.

On the other hand, when the shovel is placed on a slope, gravity affects the turning of the upper-part turning body 3. FIG. 6 illustrates a state where the shovel is placed on inclined ground (a slope). In the case illustrated in FIG. 6, the upper-part turning body 3 is turned so that the center of gravity G of the upper-part turning body 3 makes an upward turning movement along the slope. (This turn is referred to as "upward turn.") At this point, the gravity applied on the upper-part turning body 3 acts in a direction opposite to a direction in which the upper-part turning body 3 is driven and turned. Accordingly, in the state illustrated in FIG. 6, the upper-part turning body 3 is caused by its own weight to turn in a direction in which the position of the center of gravity G goes downward along the slope. That is, in order to hold the upper-part turning body 3 stationary in zero speed control, a torque in a direction opposite to a direction in which gravity acts needs to be applied by the turning electric motor 21. Furthermore, in the case where the center of gravity G is on the counterweight 3a side, the own weight works on the upper-part turning body 3 in the opposite direction. Therefore, the direction of the torque applied by the turning electric motor 21 is also reversed.

FIG. 7 also illustrates a state where the shovel is placed on inclined ground (a slope). In the case illustrated in FIG. 7, the upper-part turning body 3 is turned so that the center of gravity G of the upper-part tuning body 3 makes a downward turning movement along the slope. (This turn is referred to as "downward turn.") At this point, the gravity applied to the upper-part turning body 3 acts in the same direction as the direction in which the upper-part tuning body 3 is driven and turned. Accordingly, when in the state illustrated in FIG. 7, the upper-part turning body 3 is caused by its own weight to turn in a direction in which the position of the center of gravity G goes downward along the slope the same as in the state illustrated in FIG. 6. That is, in order to hold the upper-part turning body 3 stationary in zero speed control, a torque in a direction opposite to a direction in which gravity acts needs to be applied by the turning electric motor 21. Furthermore, in the case where the center of gravity G is on the counterweight 3a side, the own weight works on the upper-part turning body 3 in the opposite direction. Therefore, the direction of the torque applied by the turning electric motor 21 is also reversed.

Next, a description is given of a control process executed by the electric turning control unit 40. Here, it is assumed that the center of gravity G of the upper-part turning body 3 is on the bucket 6 side.

As described above, the electric turning control unit 40 controls the swing-back of the upper-part tuning body 3 by resetting a torque command value for the turning electric motor 21 to zero when the upper-part turning body 3 is decelerated so that the turning speed becomes zero (that is, when the rotational speed of the turning electric motor 21 becomes zero). However, the effect that the swing-back of the upper-part turning body 3 is controlled by resetting the torque command value to zero is obtained 1) when the shovel is placed on level ground or 2) when the shovel is placed on a slope and a stop is made quickly after an upward turn. That is, 3) when the shovel is placed on a slope and a stop is made slowly after an upward turn and 4) when the shovel is placed on a slope and a stop is made after a downward turn, resetting the torque command value to zero produces an adverse effect. Therefore, in these cases, the torque command value is not reset.

A description is given below of control of the torque command value in the above-described four conditions 1) through 4).

Figure 8:
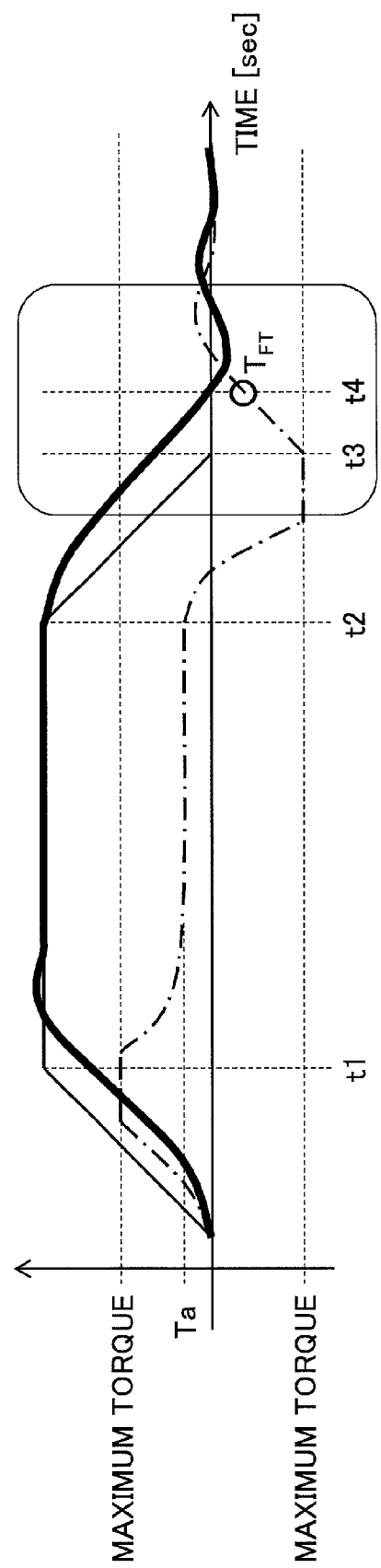
FIG. 8 is a graph illustrating changes in a speed command value, a measured speed value and a torque value at the time of stopping a turn of the upper-part turning body when the shovel is placed on level ground.
Figure 9:
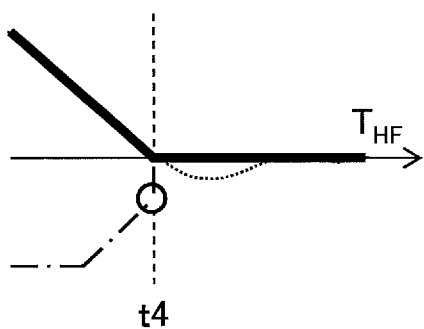
FIG. 9 is a graph illustrating the case of having reset the torque command value in the example illustrated in FIG. 8.

1) Control at the time of stopping a turn with the shovel being placed on level ground FIG. 8 is a graph illustrating changes in a speed command value for the turning electric motor 21, the measured speed value (corresponding to an actual speed) of the turning electric motor 21 and the torque value (corresponding to a torque command value) of the turning electric motor 21 at the time of stopping a turn of the upper-part turning body 3 when the shovel is placed on level ground as illustrated in FIG. 5. In FIG. 8, the speed command value for the turning electric motor 21 is indicated by a solid line, the measured speed value of the turning electric motor 21 is indicated by a bold solid line, and the torque value of the turning electric motor 21 is indicated by a dot-dash line. FIG. 8 is an example of the case of not resetting the torque command value at the time of stopping a turn. An example of the case of having reset the torque command value is illustrated in FIG. 9.

After the upper-part turning body 3 starts turning, the speed command value for the turning electric motor 21 becomes a constant value at time t1, and a constant-speed operation is performed. The measured speed value of the turning electric motor 21 follows the speed command value with a slight delay, and becomes equal to the speed command value when the constant-speed operation starts after time t1. The speed command value starts to lower at time t2 and becomes zero at time t3. Then, the measured speed value starts to lower slightly later than the speed command value, and becomes zero at time t4 (reaching zero speed).

The torque value during a constant-speed turn is maintained at a relatively low constant value Ta. In order to decelerate the turning electric motor 21, the torque value starts to lower at time t2, at which the speed command value starts to lower, and reaches a maximum torque value for a turn in the opposite direction. Thereafter, the torque value decreases from the maximum torque value after time t3 in order to weaken the deceleration. At time t4, however, at which the measured speed value becomes zero, the torque value does not become zero and a torque of a rotation in a direction opposite to that of the turn is generated for a torque value $T_{FT}$. This torque value $T_{FT}$ corresponds to the above-described integral value of deviations pertaining to integral control.

Because the torque value $T_{FT}$ is generated at time t4, the upper-part turning body 3 starts to turn in the reverse direction. After time t4, the torque value decreases to become a torque value in the opposite direction. The reverse rotation of the turning electric motor 21 is reduced and the turning electric motor 21 again rotates in the original turning direction. The upper-part turning body 3 is reduced in amplitude while slightly swinging back and forth (repeating reversal), and comes to a stop.

Here, according to this embodiment, the swinging of the turning electric motor 21 (that is, the upper-part turning body 3) is controlled by resetting the torque command value (torque value) to zero when the measured speed becomes zero at time t4. FIG. 9 is a diagram illustrating changes in the torque command value and the measured speed value when the torque command value is reset at time t4. A dotted line in the diagram indicates the measured speed value of the turning electric motor 21 in the case of not resetting the torque command value. When the torque command value is reset to zero at time t4, a toque in the opposite direction is eliminated. Therefore, there is no torque to cause the turning electric motor 21 (the upper-part turning body 3) to swing, so that it is possible to immediately stop the turning electric motor 21 (the upper-part turning body 3) without causing the turning electric motor 21 (the upper-part turning body 3) to swing after time t4.

After time t4, the speed of the turning electric motor 21 is kept at zero because the upper-part turning body 3 does not swing. As a result, the torque value reset to zero at time t4 is also kept at $T_{HF}$ (zero) thereafter.

Thus, according to this embodiment, in the case of horizontally turning and stopping the upper-part turning body 3, it is possible to eliminate the swing-back of the upper-part turning body 3 by resetting the torque command value as illustrated in FIG. 9.

Figure 10:
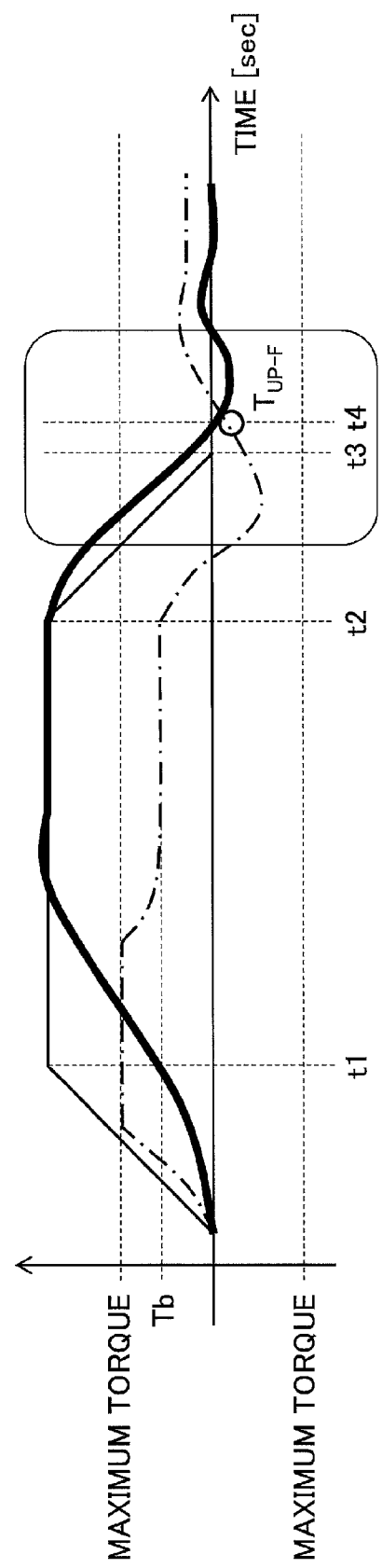
FIG. 10 is a graph illustrating changes in the speed command value, the measured speed value and the torque value at the time of quickly stopping an upward turn of the upper-part turning body when the shovel is placed on a slope.
Figure 11:
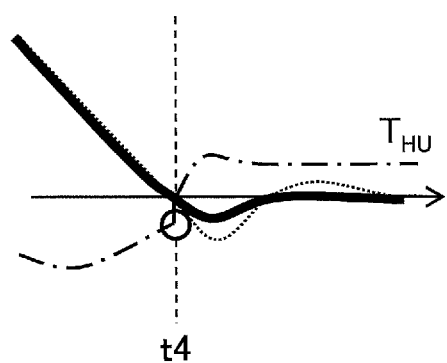
FIG. 11 is a graph illustrating the case of having reset the torque command value in the example illustrated in FIG. 10.

2) Control at the time of quickly stopping an upward turn with the shovel being placed on a slope FIG. 10 is a graph illustrating changes in a speed command value for the turning electric motor 21, the measured speed value (corresponding to an actual speed) of the turning electric motor 21 and the torque value (corresponding to a torque command value) of the turning electric motor 21 at the time of quickly stopping an upward turn of the upper-part turning body 3 when the shovel is placed on a slope as illustrated in FIG. 6. In FIG. 10, the speed command value for the turning electric motor 21 is indicated by a solid line, the measured speed value of the turning electric motor 21 is indicated by a bold solid line, and the torque value of the turning electric motor 21 is indicated by a dot-dash line. FIG. 10 is an example of the case of not resetting the torque command value at the time of stopping a turn. An example of the case of resetting the torque command value is illustrated in FIG. 11.

In the case illustrated in FIG. 10, an upward turn is made. Therefore, the measured speed value lags significantly behind the speed command value at the time of acceleration, but the measured speed value lags only slightly behind the speed command value at the time of deceleration. Furthermore, the upper-part turning body 3 is turned against gravity at the time of an upward turn. Therefore, a torque value Tb at the time of an upward turn becomes greater than at the time of a turn on level ground. In the case illustrated in FIG. 10, the upward turn is quickly stopped. Therefore, the torque value becomes zero between time t2 and time t3 and then becomes a torque value in the opposite direction the same as in the case illustrated in FIG. 8. Accordingly, at time t4, at which the measured speed value becomes zero, the torque value does not become zero and a torque of a rotation in a direction opposite to that of the upward turn is generated for a torque value $T_{UP-F}$. This torque value $T_{UP-F}$ corresponds to the above-described integral value of deviations pertaining to integral control.

Because the torque value $T_{UP-F}$ is generated at time t4, the upper-part turning body 3 starts to turn in the reverse direction. After time t4, the torque value decreases to become a torque value in the opposite direction. The reverse rotation of the turning electric motor 21 is reduced and the turning electric motor 21 again rotates in the original turning direction. The upper-part turning body 3 is reduced in amplitude while slightly swinging back and forth (repeating reversal), and comes to a stop.

Here, according to this embodiment, the swinging of the turning electric motor 21 is controlled (that is, a fall of the upper-part turning body 3 is controlled) by resetting the torque command value (torque value) to zero when the measured speed becomes zero at time t4. FIG. 11 is a diagram illustrating changes in the torque command value and the measured speed value when the torque command value is reset at time t4. A dotted line in the diagram indicates the measured speed value of the turning electric motor 21 in the case of not resetting the torque command value. When the torque command value is reset to zero at time t4, a toque in the opposite direction is eliminated. As a result, a torque in a direction in which the upper-part turning body falls because of its own weight alone serves as a torque that causes the turning electric motor 21 (the upper-part turning body 3) to swing, so that the torque that causes the turning electric motor 21 (the upper-part turning body 3) to swing is reduced. Therefore, a torque that causes the turning electric motor 21 (the upper-part turning body 3) to turn in the opposite direction after time t4 is reduced. As a result, a fall of the turning electric motor 21 (the upper-part turning body 3) is reduced, and the swinging attenuates in a short time (there is only one swing in the opposite direction in FIG. 11), so that it is possible to stop the upper-part tuning body 3 in a short time. After time t4, the turning electric motor 21 continues to output a torque $T_{HU}$ so as to prevent a fall of the upper-part turning body 3 due to its own weight.

Thus, according to this embodiment, when the upper-part turning body 3 makes an upward turn and quickly stops, it is possible to control a swing-back as well while controlling a fall of the upper-part turning body 3 due to its own weight by resetting the torque command value as illustrated in FIG. 11.

Figure 12:
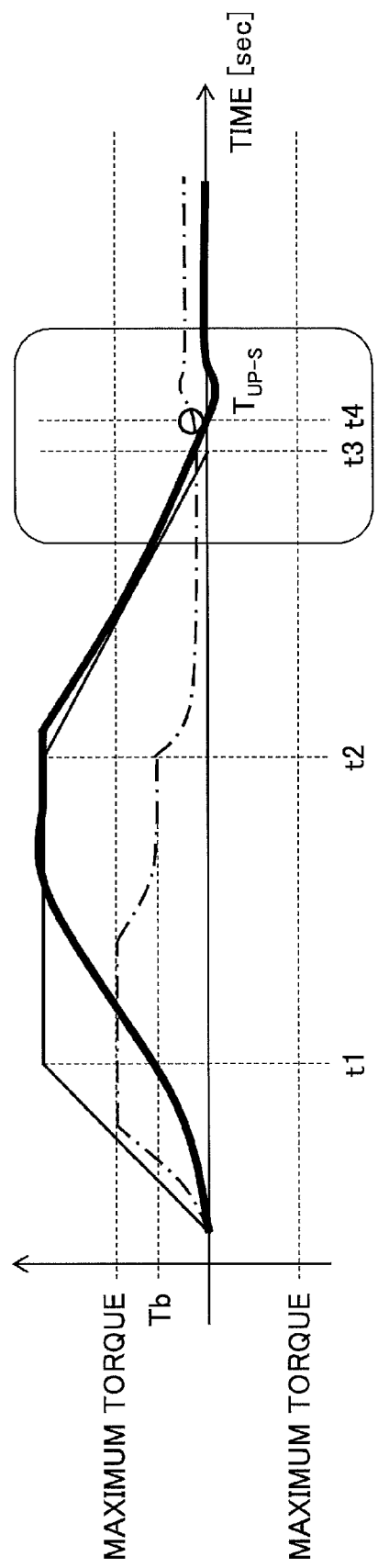
FIG. 12 is a graph illustrating changes in the speed command value, the measured speed value and the torque value at the time of slowly stopping an upward turn of the upper-part turning body when the shovel is placed on a slope.

3) Control at the time of slowly stopping an upward turn with the shovel being placed on a slope FIG. 12 is a graph illustrating changes in a speed command value for the turning electric motor 21, the measured speed value (corresponding to an actual speed) of the turning electric motor 21 and the torque value (corresponding to a torque command value) of the turning electric motor 21 at the time of slowly stopping an upward turn of the upper-part turning body 3 when the shovel is placed on a slope as illustrated in FIG. 6. In FIG. 12, the speed command value for the turning electric motor 21 is indicated by a solid line, the measured speed value of the turning electric motor 21 is indicated by a bold solid line, and the torque value of the turning electric motor 21 is indicated by a dot-dash line. FIG. 12 is an example of the case of not resetting the torque command value at the time of stopping a turn. An example of the case of resetting the torque command value is illustrated in FIG. 13.

In the case illustrated in FIG. 12, an upward turn is made. Therefore, the measured speed value lags significantly behind the speed command value at the time of acceleration, but the measured speed value lags only slightly behind the speed command value at the time of deceleration. Furthermore, because the upward turn is stopped slowly, the delay of the measured speed value relative to the speed command value is limited compared with the case illustrated in FIG. 10. Furthermore, the upper-part turning body 3 is turned against gravity at the time of an upward turn. Therefore, a torque value at the time of an upward turn becomes greater than at the time of a turn on level ground. In the case illustrated in FIG. 12, the upward turn is slowly stopped. Therefore, unlike the case illustrated in FIG. 8, the torque value does not become zero between time t2 and time t3 and a torque $T_{UF-8}$ in the upward turning direction is still generated at time t3 and time t4. That is, in the case illustrated in FIG. 12, a torque in a direction in which the upper-part turning body 3 falls because of its own weight is sufficient for the deceleration of the turn, and the turning electric motor 21 outputs the torque $T_{UP-S}$ for supporting the upper-part turning body 3. This torque value $T_{UP-3}$ corresponds to the above-described integral value of deviations pertaining to integral control.

Figure 13:
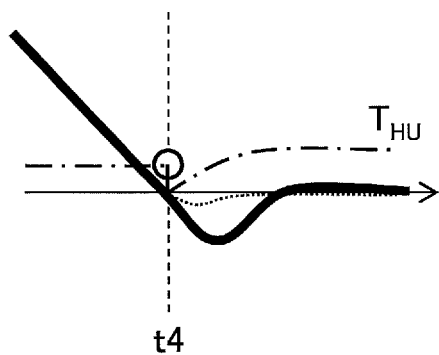
FIG. 13 is a graph illustrating the case of having reset the torque command value in the example illustrated in FIG. 12.

On the other hand, in the case illustrated in FIG. 13, the torque command value is reset at time t4. A dotted line in the diagram indicates the measured speed value of the turning electric motor 21 in the case of not resetting the torque command value. Resetting the torque command value would eliminate a torque that prevents the upper-part turning body 3 from falling. Therefore, the upper-part turning body 3 would fall greatly while the torque value increases from zero to the torque $T_{HU}$ for holding the upper-part turning body 3's own weight. Therefore, it is preferable not to reset the torque command value in the case of slowly stopping an upward turn.

According to this embodiment, even when the measured speed value becomes zero at time t4, the torque value is not reset, and the torque $T_{UP-3}$ is maintained. This torque $T_{UP-S}$ controls a fall of the upper-part turning body 3 after time t4, and the torque value after time t4 quickly reaches the torque $T_{HU}$ for preventing a fall of the upper-part turning body 3 due to its own weight.

Thus, according to this embodiment, when the upper-part turning body 3 makes an upward turn and slowly stops, it is possible to control a fall of the upper-part tuning body 3 due to its own weight by not resetting the torque command value as illustrated in FIG. 12.

Figure 14:
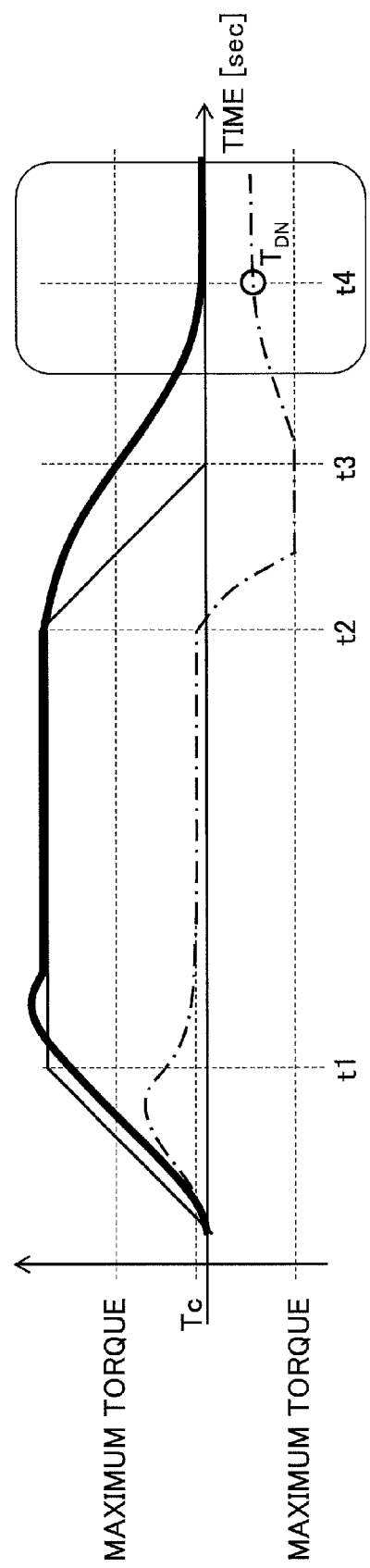
FIG. 14 is a graph illustrating changes in the speed command value, the measured speed value and the torque value at the time of stopping a downward turn of the upper-part turning body when the shovel is placed on a slope.

4) Control at the time of stopping a downward turn with the shovel being placed on a slope FIG. 14 is a graph illustrating changes in a speed command value for the turning electric motor 21, the measured speed value (corresponding to an actual speed) of the turning electric motor 21 and the torque value (corresponding to a torque command value) of the turning electric motor 21 at the time of stopping a downward turn of the upper-part turning body 3 when the shovel is placed on a slope as illustrated in FIG. 7. In FIG. 14, the speed command value for the turning electric motor 21 is indicated by a solid line, the measured speed value of the turning electric motor 21 is indicated by a bold solid line, and the torque value of the turning electric motor 21 is indicated by a dot-dash line. FIG. 14 is an example of the case of not resetting the torque command value at the time of stopping a turn. An example of the case of resetting the torque command value is illustrated in FIG. 15.

In the case illustrated in FIG. 14, a downward turn is made. Therefore, at the time of acceleration, the delay of the measured speed value relative to the speed command value is limited because of application of a torque due to the upper-part turning body 3's own weight. Furthermore, a torque Tc after time t1 is smaller than that at the time of a turn on level ground (Tc<Ta). On the other hand, at the time of deceleration for stopping, it is necessary to counteract a torque due to the upper-part turning body 3's own weight. Therefore, the delay of the measured speed value relative to the speed command value increases. In the case illustrated in FIG. 14, a downward turn is stopped. Therefore, the torque value becomes zero immediately after time t2, and a torque value in the opposite direction reaches a maximum value thereafter. The torque in the opposite direction increases to counteract a torque due to the inertia of the upper-part turning body 3 and a torque due to the weight of the upper-part turning body 3. At time t4, at which the measured speed value becomes zero, the torque value does not become zero and a torque of a rotation in a direction opposite to that of the downward turn is generated for a torque value $T_{DN}$. This torque value $T_{ON}$ corresponds to the above-described integral value of deviations pertaining to integral control.

The torque value $T_{DN}$ is a torque in the same direction as the torque $T_{HU}$ for preventing a fall of the upper-part turning body 3 due to its own weight. Because the torque $T_{DN}$ is generated at time t4, a torque due to the upper-part turning body 3's own weight is canceled, so that the upper-part turning body 3 is prevented from falling after time t4.

Figure 15:
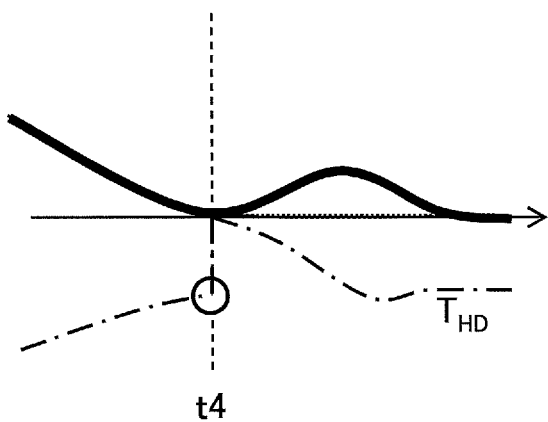
FIG. 15 is a graph illustrating the case of having reset the torque command value in the example illustrated in FIG. 14.

On the other hand, in the case illustrated in FIG. 15, the torque command value is reset at time t4. A dotted line in the diagram indicates the measured speed value of the turning electric motor 21 in the case of not resetting the torque command value. Resetting the torque command value would eliminate a torque that prevents the upper-part turning body 3 from falling. Therefore, the upper-part turning body 3 would fall greatly while the torque value increases from zero to a torque $T_{HD}$ for holding the upper-part turning body 3's own weight. Therefore, it is preferable not to reset the torque command value in the case of stopping a downward turn.

According to this embodiment, even when the measured speed value becomes zero at time t4, the torque value is not reset, and the torque $T_{DN}$ is maintained. This torque $T_{DN}$ controls a fall of the upper-part turning body 3 after time t4, and the torque value after time t4 quickly reaches the torque $T_{HD}$ for preventing a fall of the upper-part turning body 3 due to its own weight.

Thus, according to this embodiment, when the upper-part turning body 3 makes a downward turn and stops, it is possible to prevent swinging while controlling a fall of the upper-part tuning body 3 due to its own weight by not resetting the torque command value as illustrated in FIG. 14.

Figure 16:
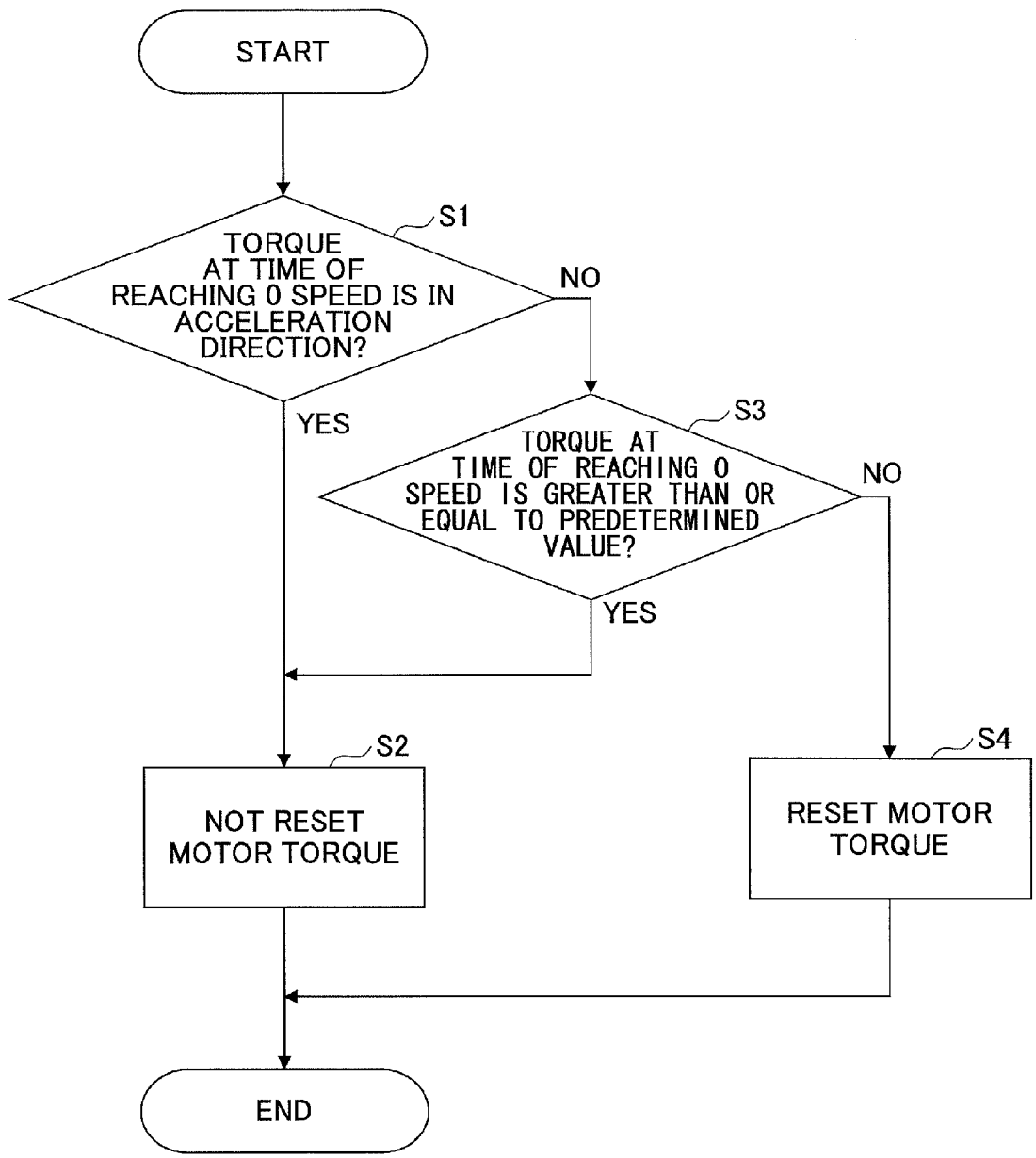
FIG. 16 is a flowchart of a process for controlling the torque of a turning electric motor at the time of stopping a turn of the upper-part tuning body.

Next, a description is given, with reference to FIG. 16, of control of the torque of the turning electric motor 2 executed by the electric turning control unit 40 according to this embodiment. FIG. 16 is a flowchart of a process for controlling the torque of the turning electric motor 21 at the time of stopping a turn of the upper-part tuning body 3.

When the torque control process starts, first, at step S1, it is determined whether a torque command value for the turning electric motor 21 at the time when the turning speed of the upper-part turning body 3 becomes zero is in an acceleration direction.

If it is determined at step S1 that the torque command value is in the acceleration direction (YES at step S1), the process proceeds to step S2. It is when an upward turn is slowly stopped with the shovel being placed on a slope as described above in 3) that it is determined that the torque command value is in the acceleration direction. At step S2, the torque command value is fed as is to the turning electric motor 21 without being reset.

On the other hand, if it is determined at step S1 that the torque command value is not in the acceleration direction (NO at step S1), the process proceeds to step S3. It is when a turn is stopped with the shovel being placed on level ground as described above in 1), when an upward turn is quickly stopped with the shovel being placed on a slope as described above in 2), or when a downward turn is stopped with the shovel being placed on a slope as described above in 4) that it is determined that the torque command value is not in the acceleration direction.

At step S3, it is determined whether the torque command value for the turning electric motor 21 at the time when the turning speed of the upper-part turning body 3 becomes zero is greater than or equal to a preset predetermined value $T_{TH}$ This predetermined value $T_{TH}$ is the absolute value of a torque value in the case of determining that a torque value in a turning direction is positive and a torque value in a direction opposite to the turning direction is negative, and may be set to a value between the absolute value of the torque $T_{DN}$ (negative value) illustrated in FIG. 14 and the absolute value of the torque $T_{FT}$ (negative value) illustrated in FIG. 8 ($T_{DN}>T_{TH}>T_{FT}$).

If it is determined at step S3 that the torque value is greater than or equal to the predetermined value (YES at step S3), the process proceeds to step S2, and the torque command value is fed as is to the turning electric motor 21 without being reset. It is when a downward turn is stopped with the shovel being placed on a slope as described above in 4) that the torque command value is determined to be greater than or equal to the predetermined value and the process proceeds to step S2.

On the other hand, if it is determined at step S3 that the torque value is not greater than or equal to the predetermined value (NO at step 33), the process proceeds to step S4. It is when a turn is stopped with the shovel being placed on level ground as described above in 1) or when an upward turn is quickly stopped with the shovel being placed on a slope as described above in 2) that the torque command value is determined to be not greater than or equal to the predetermined value and the process proceeds to step S4. At step S4, the torque command value for the turning electric motor 21 at the time when the turning speed of the upper-part turning body 3 becomes zero (time t4) is reset and set to zero. It is when a turn is stopped with the shovel being placed on level ground as described above in 1) or when an upward turn is quickly stopped with the shovel being placed on a slope as described above in 2) that the process proceeds to step S4. In these cases, the torque command value is reset.

According to the above-described torque control process, if the direction of a torque at the time of reaching zero speed is an acceleration direction, the torque command value for the turning electric motor 21 is not reset. On the other hand, if the direction of a torque at the time of reaching zero speed is a deceleration direction and the absolute value of the torque is less than the predetermined value $T_{TH}$, the torque command value for the turning electric motor 21 is reset to zero. Furthermore, if the direction of a torque at the time of reaching zero speed is a deceleration direction and the absolute value of the torque is greater than or equal to the predetermined value $T_{TH}$, the torque command value for the turning electric motor 21 is not reset.

That is, according to the above-described torque control process, it is determined whether to reset (set to zero; a torque command value for the turning electric motor 21 based on the direction and the magnitude of a torque at the time of the stop of a turn (at the time of reaching zero speed), thereby achieving both control of a swing-back on level ground and control of a fall on a slope. In particular, there is no need to determine whether it is level ground or a slope using, for example, an inclination sensor, so that it is possible to implement an effective torque control process with a simple process. Furthermore, there is no need to determine where the center of gravity of the upper-part turning body 3 is located relative to the center of turning, so that it is possible to implement torque control on a slope irrespective of the position of the center of gravity.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

Embodiments of the present invention may be applied to an electric turning control unit that drives a turnable body provided in a construction machine and to a method of controlling a turning electric motor.

What is claimed is:

1. A construction machine, comprising:
    a lower-part traveling body;
    an upper-part turning body mounted on the lower-part traveling body through a turning mechanism configured to turn the upper-part turning body horizontally relative to the lower-part traveling body;
    a turning electric motor configured to drive the turning mechanism; and
    a control unit configured to control driving of the turning electric motor,
    wherein the control unit includes
        a processor; and
        a memory storing a program that, when executed by the processor, causes the control unit to cause an output torque of the turning electric motor to selectively continue after a turning speed of the upper-part turning body becomes zero, based on a direction in which the upper-part turning body has turned, and a magnitude of the output torque or a direction of the output torque of the turning electric motor, when the turning speed of the upper-part turning body becomes zero because of deceleration of the upper-part turning body,
    wherein the control unit causes the output torque of the turning electric motor to be zero or reduced when an absolute value of the output torque of the turning electric motor, when the turning speed of the upper-part turning body becomes zero, is less than a predetermined value, in a case where a turn of the upper-part turning body is stopped with the construction machine being placed on level ground or in a case where an upward turn of the upper-part turning body is quickly stopped with the construction machine being placed on a slope.

2. The construction machine as claimed in claim 1, wherein the control unit causes the output torque of the turning electric motor to continue when a direction of the output torque of the turning electric motor, when the turning speed of the upper-part turning body becomes zero, is equal to the direction in which the upper-part turning body has turned.

3. The construction machine as claimed in claim 2, wherein the control unit causes the output torque of the turning electric motor to continue when the direction of the output torque of the turning electric motor, when the turning speed of the upper-part turning body becomes zero, is equal to the direction in which the upper-part turning body has turned, in a case where an upward turn of the upper-part turning body is slowly stopped with the construction machine being placed on a slope.

4. The construction machine as claimed in claim 2, wherein the control unit causes the output torque of the turning electric motor to continue by maintaining the output torque of the turning electric motor output before or after the turning speed of the upper-part turning body becomes zero.

5. The construction machine as claimed in claim 2, wherein the control unit prevents the output torque of the turning electric motor output before or after the turning speed of the upper-part turning body becomes zero from being maintained, by causing the output torque of the turning electric motor to be zero or reduced.

6. The construction machine as claimed in claim 1,
wherein the control unit controls the output torque of the turning electric motor by proportional integral control, and
wherein the control unit resets an integral component in the proportional integral control to zero when the absolute value of the output torque of the turning electric motor, when the turning speed of the upper-part turning body becomes zero, is less than the predetermined value.

7. The construction machine as claimed in claim 1, wherein the control unit causes the output torque of the turning electric motor to continue when a magnitude of the output torque of the turning electric motor, when the turning speed of the upper-part turning body becomes zero, is greater than or equal to the predetermined value.

8. The construction machine as claimed in claim 7,
wherein the control unit controls the output torque of the turning electric motor by proportional integral control, and
wherein the control unit resets an integral component in the proportional integral control to zero when the absolute value of the output torque of the turning electric motor, when the turning speed of the upper-part turning body becomes zero, is less than the predetermined value.

9. The construction machine as claimed in claim 7, wherein the control unit causes the output torque of the turning electric motor to continue when a magnitude of the output torque of the turning electric motor, when the turning speed of the upper-part turning body becomes zero, is greater than or equal to the predetermined value, in a case where a downward turn of the upper-part turning body is stopped with the construction machine being placed on a slope.

10. The construction machine as claimed in claim 7, wherein the control unit causes the output torque of the turning electric motor to continue by maintaining the output torque of the turning electric motor output before or after the turning speed of the upper-part turning body becomes zero.

11. The construction machine as claimed in claim 1, wherein the control unit prevents the output torque of the turning electric motor output before or after the turning speed of the upper-part turning body becomes zero from being maintained, by causing the output torque of the turning electric motor to be zero or reduced.

12. The construction machine as claimed in claim 1, wherein the control unit causes the output torque of the turning electric motor to selectively continue after the turning speed of the upper-part turning body becomes zero, with a lever for operating the turning electric motor being at a neutral position.

13. The construction machine as claimed in claim 1, further comprising:
an electrical energy storage unit configured to store electric power as electrical energy; and
an inverter configured to supply the electric power from the electrical energy storage unit to the turning electric motor based on a command from the control unit.

14. A method of controlling a turning electric motor of a construction machine, the construction machine including a lower-part traveling body, an upper-part turning body mounted on the lower-part traveling body through a turning mechanism configured to turn the upper-part turning body horizontally relative to the lower-part traveling body, the turning electric motor configured to drive the turning mechanism, and a control unit to control driving of the turning electric motor, the method comprising:
causing the upper-part turning body to turn relative to the lower-part traveling body by driving the turning electric motor to rotate in a first direction;
decelerating the upper-part turning body by driving the turning electric motor to rotate in a second direction reverse to the first direction; and
causing, by the control unit, an output torque of the turning electric motor to selectively continue after a turning speed of the upper-part turning body becomes zero, based on a direction in which the upper-part turning body has turned, and a magnitude of the output torque or a direction of the output torque of the turning electric motor, when the turning speed of the upper-part turning body, becomes zero because of deceleration of the upper-part turning body,
wherein the output torque of the turning electric motor is caused to be zero or reduced when an absolute value of the output torque of the turning electric motor, when the turning speed of the upper-part turning body becomes zero, is less than a predetermined value, in a case where a turn of the upper-part turning body is stopped with the construction machine being placed on level ground or in a case where an upward turn of the upper-part turning body is quickly stopped with the construction machine being placed on a slope.

* * * * *